United States Patent
Jones et al.

(10) Patent No.: US 7,173,914 B2
(45) Date of Patent: Feb. 6, 2007

(54) COMMUNICATION NODE RECEIPT OF NODE-OUTPUT INFORMATION FROM PROCESSORLESS CENTRAL EQUIPMENT

(75) Inventors: Stephen Jones, Olney, MD (US); Jerry L. Shumway, Rockville, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 877 days.

(21) Appl. No.: 09/945,558

(22) Filed: Aug. 30, 2001

(65) Prior Publication Data
US 2003/0043819 A1   Mar. 6, 2003

(51) Int. Cl.
*H04L 12/16* (2006.01)
*H04M 3/42* (2006.01)

(52) U.S. Cl. ............................ 370/265; 379/202.01
(58) Field of Classification Search ............ 370/398, 370/400, 434, 263–267; 379/202.01, 207.01
See application file for complete search history.

(56) References Cited

U.S. PATENT DOCUMENTS

| 1,623,095 | A | * | 4/1927 | Crisson et al. ......... 379/202.01 |
|---|---|---|---|---|
| 2,189,994 | A | * | 2/1940 | Reier ..................... 379/204.01 |
| 3,293,369 | A | * | 12/1966 | Schroeder ................... 370/263 |
| 3,649,763 | A | * | 3/1972 | Thompson ................... 370/372 |
| 4,112,497 | A | * | 9/1978 | Fletcher et al. ............. 708/422 |
| 4,119,807 | A | * | 10/1978 | Nahay ......................... 370/269 |
| 4,425,478 | A | * | 1/1984 | van Mil et al. ......... 379/202.01 |
| 5,057,932 | A | * | 10/1991 | Lang ........................... 386/101 |
| 5,883,986 | A | * | 3/1999 | Kopec et al. ................ 382/310 |
| 6,061,348 | A |   | 5/2000 | Castrigno et al. |
| 6,487,213 | B1 | * | 11/2002 | Chao ........................... 370/418 |
| 6,522,689 | B1 | * | 2/2003 | Heinrich ..................... 375/224 |
| 6,779,129 | B2 | * | 8/2004 | Gregg et al. ................... 714/6 |
| 7,006,456 | B2 | * | 2/2006 | Rabipour et al. ........... 370/260 |
| 2001/0048688 | A1 | * | 12/2001 | Fuhrmann et al. .......... 370/407 |

OTHER PUBLICATIONS

"Processor." The American Heritage Dictionary of the English Language, Fourth Edition. Houghton Mifflin Company, 2000.*
Bonsor, Kevin. "How DNA Computers Will Work." How Stuff Works. <http://computer.howstuffworks.com/dna-computer.htm>.*
Bonsor, Kevin. "How Quantum Computers Will Work." How Stuff Works. <http://computer.howstuffworks.com/quantum-computer.htm>.*

(Continued)

*Primary Examiner*—Chau Nguyen
*Assistant Examiner*—Kerri M. Rose
(74) *Attorney, Agent, or Firm*—Carmen B. Patti & Assoc., LLC

(57) ABSTRACT

A first communication node of a plurality of communication nodes connected with processorless central equipment in a system sends one or more first portions of node-output information to the processorless central equipment. One or more additional communication nodes of the plurality of communication nodes send one or more additional portions of node-output information to the processorless central equipment. The first communication node receives from the processorless central equipment a portion of central-output information. The portion of central-output information comprises the one or more first portions of node-output information and the one or more additional portions of node-output information.

36 Claims, 7 Drawing Sheets

OTHER PUBLICATIONS

"multiplexer," http://www.computeruser.com/resources/dictionary/definition.html?lookup=3683;Computeruser.com, Inc.; 1250 Ninth Street, Berkeley, CA. 94710, USA; Aug. 22, 2001, 1 pg.

"backbone," http://www.computeruser.com/resources/dictionary/definition.html?lookup=380;Computeruser.com, Inc.; 1250 Ninth Street, Berkeley, CA. 94710, USA; Aug. 22, 2001, 1 pg.

"frame relay,"http://www.computeruser.com/resources/dictionary/definition.html?lookup=2751;Computeruser.com, Inc.; 1250 Ninth Street, Berkeley, CA. 94710, USA; Aug. 20, 2001, 1 pg.

"frame,"http://www.computeruser.com/resources/dictionary/definition.html?lookup=6855;Computeruser.com, Inc.; 1250 Ninth Street, Berkeley, CA. 94710, USA; Aug. 20, 2001, 1 pg.

"Time Division Multiplexing,"http://faraday.ukc.ac.uk/faraday/tdm.html;The Institution of Electrical Engineers; Savoy Place, London, WC2R 0BL, UK; Aug. 17, 2001, 2 pgs.

"OC-1," http://www.acronymfinder.com/af-query.asp?String=exact&Acronym=oc-1&Find=Find; Mountain Data Systems; P.O. Box 3283, Estes Park, CO 80517, USA; AUg. 15, 2001, 1 pg.

"OC-3," http://acronymfinder.com/af-query.asp?String=exact&Acronym=OC-3; Mountain Data Systems; P.O. Box 3283, Estes Park, CO 80517, USA; Aug. 22, 2001, 1 pg.

"private automatic branch exchange (PABX)," http://www.worldcom.com/tools-resources/communications_library/; WorldCom, 1200 South Hayes Street, 11th Floor, Arlington, VA 22202, USA; Aug. 16, 2001, 1 pg.

"private automatic branch exchange," http://www.computeruser.com/resources/dictionary/definition/.html?lookup=7086; Computeruser.com, Inc.; 1250 Ninth Street, Berkeley, CA 94710, USA; Aug. 16, 2001, 1 pg.

"backbone," http://www.dictionary.com/cgi-bin/dict.pl?term=backbone; Webster's Revised Unabridged Dictionary; MICRA, Inc., 735 Belvidere Ave., Plainfield, NJ 07062-2054, USA Aug. 27, 2001, 2 pgs.

"backbone," http://www.dictionary.com/cgi-bin/dict.pl?term=backbone; On-line Medical Dictionary; Academic Medical Publishing and CancerWEB, Gray Laboratory, Mount Vernon Hospital, Northwood, Middlesex HA6 2JR UK, 2 pgs.

"backbone," http://www.dictionary.com/cgi-bin/dict.pl?term=backbone; WorldNet—a Lexical Database for English; Cognitive Science Laboratory, Princeton University, 221 Nassau St., Princeton, NJ 08542, USA, 2 pgs.

"backbone," http://www.dictionary.com/cgi-bin/dict.pl?term=backbone; The American Heritage Dictionary of the English Language, Fourth Edition, Houghton Mifflin Company, Dictionary Department Permissions, 222 Berkeley Street, 8th Floor, Boston, MA 02116 USA, 2 pgs.

"backbone," http://www.dictionary.com/cgi-bin/dict.pl?term=backbone; Free On-Line Dictionary of Computing, http://www.foldoc.org/, Editor Denis Howe, 2 pgs.

* cited by examiner

100

100

COMMUNICATION NODE RECEIPT OF NODE-OUTPUT INFORMATION FROM PROCESSORLESS CENTRAL EQUIPMENT

TECHNICAL FIELD

The invention in one embodiment relates generally to communications and more particularly to handling of information among central equipment and a plurality of communication nodes.

BACKGROUND

One implementation of a communication system employs time division multiplexing ("TDM"). The communication system comprises central equipment connected with a plurality of communication nodes. The central equipment comprises switching capabilities.

Strategies for time slot assignment and bandwidth assignment in the communication system aim to minimize requirements for bandwidth through the central equipment, especially to and from the communication nodes. The switching architecture of the communication system presents only a fractional part of the total system bandwidth to the communication nodes, especially remote nodes.

For communication other than a voice conference, a narrowband signal sent through the fractional bandwidth from one communication node is switched, virtually, through the central equipment and delivered to another communication node. If a full duplex connection between communication nodes is required, a similar return path is set up.

For a voice conference, a number of narrowband signals from participating communication nodes are sent through fractional bandwidth channels to the central equipment to be summed, and then sent through a fractional channel to each communication node participating in the voice conference. There may be multiple simultaneous conferences. In addition, a communication node may contribute to more than one conference.

To perform the above-described switching and conferencing, the central equipment requires significant processor power that comprises intelligence capabilities. In one example, the implementation employs many processors, for example, one processor for each of the communication nodes. In another example, the implementation employs a pair of massive processors for all the communication nodes. The requirement for this processor power in the central equipment presents an expense to the implementation of the communication system.

Thus, a need exists for enhanced handling of information among central equipment and communication nodes. A further need exists for decreased requirements for intelligence capabilities of the central equipment.

SUMMARY

Pursuant to one embodiment of the invention, shortcomings of the existing art are overcome and additional advantages are provided through the provision of communication node receipt of node-output information from processorless central equipment.

The invention in one embodiment encompasses a system. The system includes a first communication node of a plurality of communication nodes connected with processorless central equipment. The first communication node sends one or more first portions of node-output information to the processorless central equipment. One or more additional communication nodes of the plurality of communication nodes send one or more additional portions of node-output information to the processorless central equipment. The first communication node receives from the processorless central equipment a portion of central-output information. The portion of central-output information comprises the one or more first portions of node-output information and the one or more additional portions of node-output information.

Another embodiment of the invention encompasses a method. One or more first portions of node-output information are sent to processorless central equipment from a first communication node of a plurality of communication nodes connected with the processorless central equipment. One or more additional communication nodes of the plurality of communication nodes send one or more additional portions of node-output information to the processorless central equipment. A portion of central-output information is received from the processorless central equipment at the first communication node. The portion of central-output information comprises the one or more first portions of node-output information and the one or more additional portions of node-output information.

A further embodiment of the invention encompasses an article. The article includes a computer-readable signal-bearing medium. The article includes means in the medium for sending one or more first portions of node-output information to processorless central equipment from a first communication node of a plurality of communication nodes connected with the processorless central equipment. The one or more additional communication nodes of the plurality of communication nodes send one or more additional portions of node-output information to the processorless central equipment. The article includes means in the medium for receiving at the first communication node a portion of central-output information from the processorless central equipment. The portion of central-output information comprises the one or more first portions of node-output information and the one or more additional portions of node-output information.

These and other features and advantages of one embodiment of the invention will become apparent from the description, the accompanying drawings, and the claims.

DETAILED DESCRIPTION

In one embodiment of the invention, a communication node receives node-output information from processorless central equipment. A detailed discussion of one exemplary embodiment of the invention is presented herein, for illustrative purposes.

Figure 1:
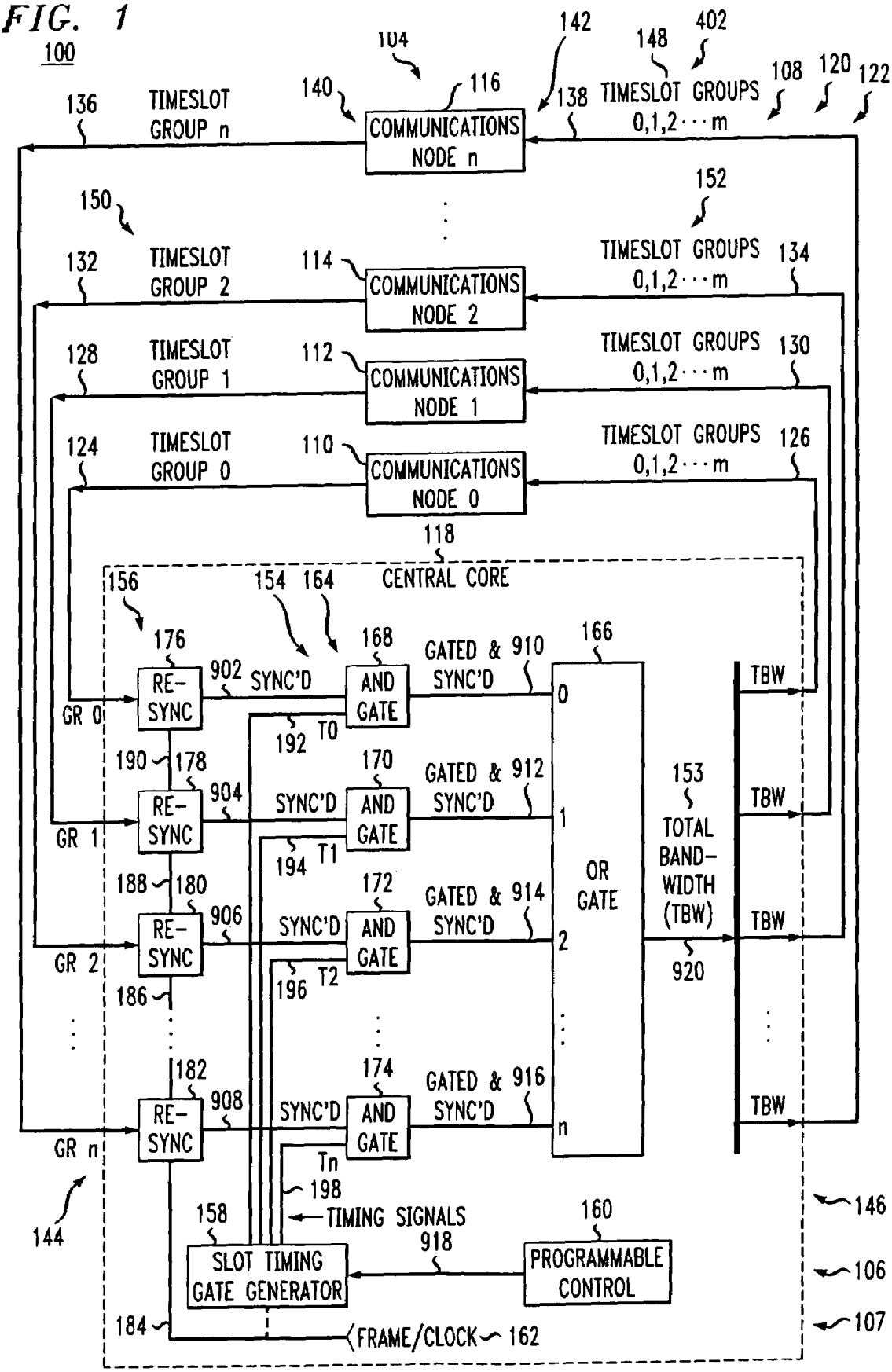
FIG. 1 is a functional block diagram of one example of a system that includes one or more instances of a communication node, one or more instances of central equipment, one or more instances of a passage, and one or more instances of information.

Turning to FIG. 1, system 100, in one example, includes a plurality of components such as computer software and/or hardware components. A number of such components can be combined or divided in one example of system 100. System 100 in one example employs at least one computer-readable signal-bearing medium. One example of a computer-readable signal-bearing medium for system 100 comprises an instance of recordable data storage medium 102 (FIG. 5) such as one or more of a magnetic, electrical, optical, biological, and atomic data storage medium. In another example, a computer-readable signal-bearing medium for system 100 comprises a modulated carrier signal transmitted over a network comprising or coupled with system 100, for instance, one or more of a telephone network, a local area network ("LAN"), the Internet, and a wireless network. An exemplary component of system 100 employs and/or comprises a series of computer instructions written in or implemented with any of a number of programming languages, as will be appreciated by those skilled in the art.

Referring again to FIG. 1, system 100 in one example comprises one or more components, for example, one or more instances of communication node 104, one or more instances of central equipment 106, one or more instances of passage 108, and one or more instances of information 120.

Still referring to FIG. 1, communication node 104 in one example comprises one or more instances of one or more of a remote terminal, a radio interface, a telephone line interface, a data interface, a video interface, an air traffic control station, and a military command control station. For example, an operator (not shown) operates communication node 104. In one example, the operator comprises an air traffic controller that operates an air traffic control station that comprises communication node 104, to communicate with one or more pilots (not shown) that operate one or more airplanes (not shown), as will be appreciated by those skilled in the art.

Figure 5:
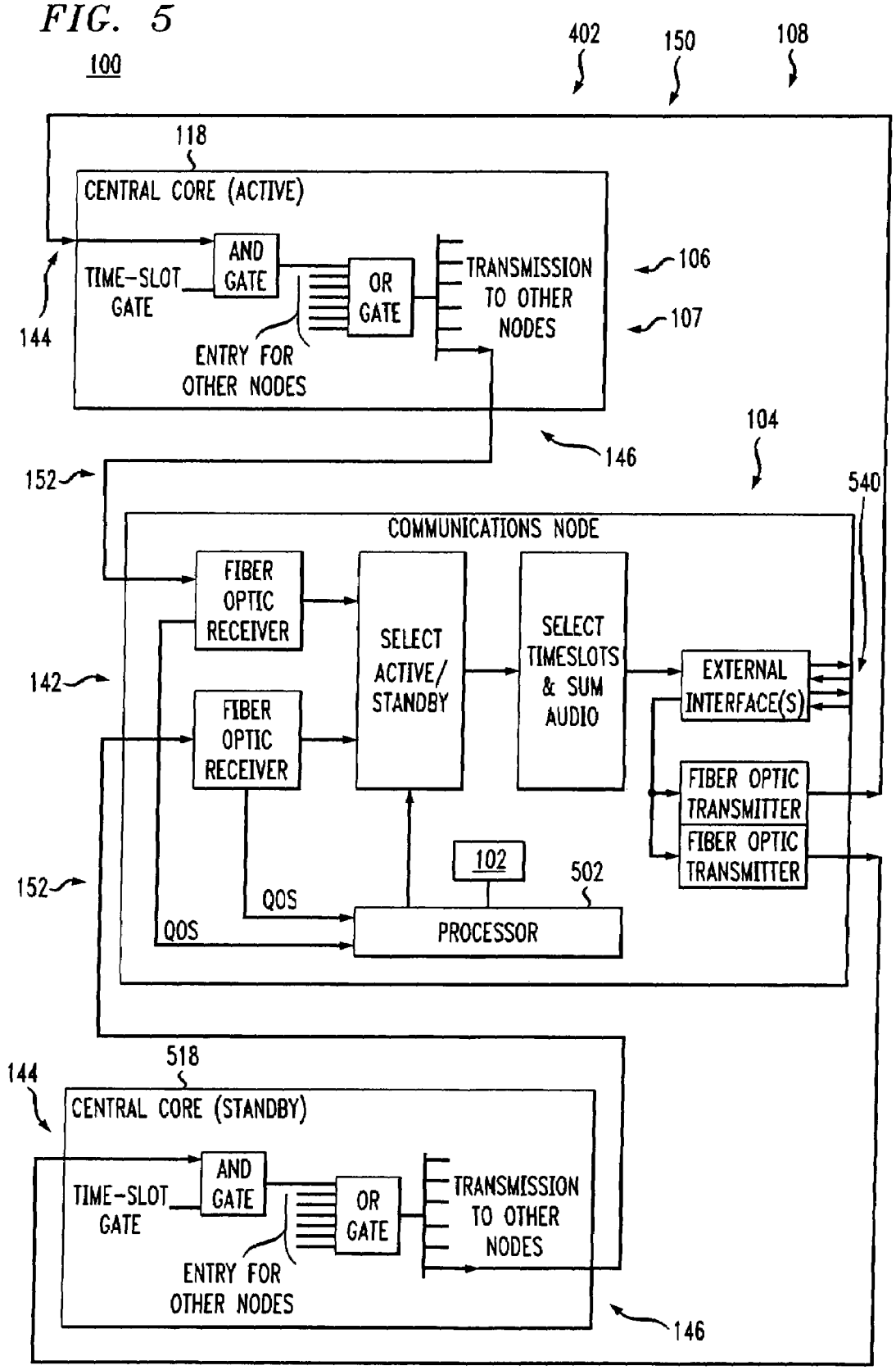
FIGS. 5–6 represents illustrative details of exemplary redundancy of a plurality of portions of the system of FIG. 1.

Referring further to FIG. 1, communication node 104 in one example comprises one or more of output interface 140, input interface 142, and one or more instances of additional interface 540 (FIG. 5). Exemplary instances of communication node 104 comprise communication nodes 110, 112, 114, and 116.

Again referring to FIG. 1, central equipment 106 in one example comprises one or more instances of gate 154, one or more instances of synchronization component 156, one or more instances of buffer component 922 (FIG. 7), one or more instances of timing generator component 158, one or more instances of control component 160, and one or more instances of passage 108. In one example, central equipment 106 is coupled with clock 162. In another example, central equipment 106 comprises clock 162. Exemplary instances of gate 154 comprise AND gate 164 and OR gate 166. AND gate 164 in one example performs a logical AND function. Exemplary instances of AND gate 164 comprise AND gates 168, 170, 172, and 174. OR gate 166 in one example performs a logical OR function. Exemplary instances of synchronization component 156 comprise synchronization components 176, 178, 180, and 182, as will be appreciated by those skilled in the art.

Further referring to FIG. 1, central equipment 106 in one example comprises processorless central equipment 107. Processorless central equipment 107 in one example omits processor 502 (FIG. 5), as described herein. In one example, central equipment 106 comprises one or more instances of one or more of a central core and a conference switch, for example, an air traffic control ("ATC") switch. In a further example, central equipment 106 comprises input interface 144 and output interface 146. Exemplary instances of central equipment 106 comprise central equipment 118 and 518 (FIG. 5).

Still referring to FIG. 1, passage 108 in one example comprises a communications passage. For example, passage 108 serves to communicate one or more instances of information 120. In one example, passage 108 comprises a number of portions of one or more of a communications link, an electrical path, an optical path, a wireline path, and a hardware path. For example, passage 108 comprises fiberoptic passage 122. In another example, passage 108 comprises a copper passage. Exemplary instances of passage 108 comprise passages 124, 126, 128, 130, 132, 134, 136, 138, 178, 180, 182, 184, 186, 188, 190, 192, 194, 196, 198, 902, 904, 906, 908, 910, 912, 914, 916, 918, and 920.

In one example, referring to FIG. 1, passages 124, 126, 128, 130, 132, 134, 136, and 138 comprise respective instances of fiberoptic passage 122. In another example, passages 124, 126, 128, 130, 132, 134, 136, and 138 comprise respective copper passages. In yet another example, any of passages 124, 126, 128, 130, 132, 134, 136, and 138 comprises a respective instance of fiberoptic passage 122 or a copper passage. For example, passages 124, 126, 128, 130, 132, 134, 136, and 138 comprise respective instances of fiberoptic passage 122 or respective copper passages.

Figure 4:
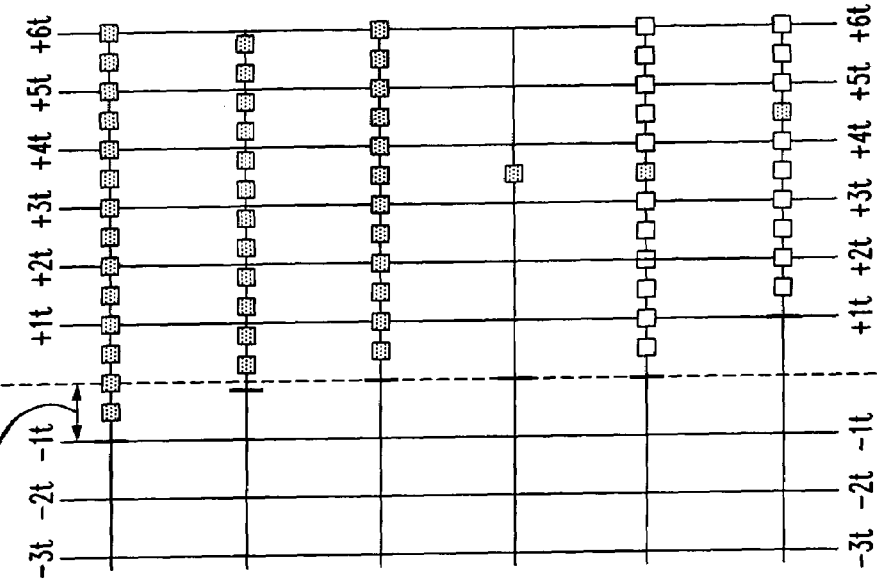

Referring further to FIG. 1, information 120 in one example comprises communication frame 402 (FIG. 4). Exemplary instances of information 120 comprise node-output information 150 and central-output information 152. Central-output information 152 in one example comprises total bandwidth 153. For example, central-output information 152 comprises system backbone information, as described herein.

Referring still to FIG. 1, central equipment 106 in one example is connected with a plurality of instances of communication node 108. For example, central equipment 118 is connected with communication nodes 110, 112, 114, and 116. In one example, passages 124, 128, 132, and 136 serve to couple output interface 140 of communication nodes 110, 112, 114, and 116, respectively, with input interface 144 of central equipment 118. In a further example, passages 126, 130, 134, and 138 serve to couple output interface 146 of central equipment 118 with input interface 142 of communication nodes 110, 112, 114, and 116, respectively.

Again referring to FIG. 1, system 100 comprises a plurality of instances of communication node 104 connected with central equipment 106, for example, processorless central equipment 107. A first instance of communication node 104 in one example sends an instance of node-output information 150 to processorless central equipment 106. One or more additional instances of communication node 104 in one example send one or more additional instances of node-output information 150 to the processorless central equipment.

Referring still to FIG. 1, in one example, the first instance of communication node 104 sends a subportion of all output information from that instance of communication node 104 to central equipment 106. In another example, the first instance of communication node 104 sends all output information from that instance of communication node 104 to processorless central equipment 106. In a further example, an additional instance of communication node 104 sends a subportion of all output information from that instance of communication node 104 to processorless central equipment 106. In yet another example, an additional instance of communication node 104 sends all output information from that instance of communication node 104 to central equipment 106.

Again referring to FIG. 1, the first instance of communication node 104 in one example receives a portion of central-output information 152 from central equipment 106. The portion of central-output information in one example comprises one or more portions of node-output information 150. In one example, the portion of central-output information comprises all portions of node-output information 150 from all instances of communication node 104 in system 100.

Referring still to FIG. 1, in one example, the portion of central-output information 152 comprises a subportion of all output information from a particular instance of central equipment 106. In another example, the portion of central-output information 152 comprises all output information from a particular instance of central equipment 106. Central equipment 106 in one example sends central-output information 152 to all instances of communication node 104 in system 100. In another example, central equipment 106 sends central-output information 152 to a plurality of instances of communication node 104, though less than all instances of communication node 104, in system 100.

Again referring to FIG. 1, communication node 104 in one example processes any one or more portions of central-output information 152 from central equipment 106. For example, communication node 104 can select any one or more portions of central-output information 152. In a further example, communication node 104 processes any one or more portions of node-output information in central-output information 152 from central equipment 106. In a still further example, communication node 104 processes any one or more portions of node-output information from any one or more instances of communication node 104.

Referring again to FIG. 1, communication node 104 and central equipment 106 in one example communicate through employment of time division multiplexing ("TDM"). In one example, a plurality of instances of communication node 104 and one or more instances of central equipment 106 comprise a time division multiplexing architecture. For example, communication node 104 and central equipment 106 employ a standard time division multiplexing format such as Optical Carrier 1 ("OC-1," 51.8-MHz) or Optical Carrier 3 ("OC-3," 155.4-MHz). In one example, communication node 104 and central equipment 106 employ a plurality of instances of communication frame 402. Communication frame 402 in one example comprises a time duration of 125 microseconds (μsec) and a repetition frequency of 8000 times per second, as will be appreciated by those skilled in the art.

In a further example, referring to FIG. 1, communication frame 402 is divided into a number N instances of time slot 148. The number N instances of time slot 148 in one example are ordered in time, and repeat themselves in each instance of communication frame 402. For example, the number N instances of time slot 148 are identified as 0 through m, where m=N−1. The number N instances of time slot 148 in one examples varies depending upon constraints of system 100. In one example, the number N instances of time slot 148 in communication frame 402 is between 500 and 2500.

Referring still to FIG. 1, communication node 104 in one example sends node-output information 150 to central equipment 106 in communication frame 402. In a further example, communication node 104 receives central-output information 152 from central equipment 106 in the communication frame 402.

Still referring to FIG. 1, an instance of communication node 104 in one example is assigned one or more instances of time slot 148, possibly, though not necessarily, sequentially, designating when that instance of communication node 104 is to send one or more portions of its respective instance of node-output information 150. In a further example, each instance of communication node 104 is assigned a distinct set of instances of time slot 302 upon initialization of system 100. So, no two or more instances of communication node 104 share a same instance of time slot 148.

Referring further to FIG. 1, system 100 in one example pre-assigns one or more instances of time slot 148 to one or more instances of communication node 104. For example, system 100 performs pre-assignment of one or more instances of time slot 148 upon initialization of one or more instances of communication node 104. In a further example, system 100 pre-assigns all instances of time slot 148.

Again referring to FIG. 1, communication node 104 in one example sends node-output information 150 to central equipment 106 within 404 interval before a pre-assigned instance of time slot 148 of a set of time slots that comprise communication frame 402 of central-output information 152. In one example, communication node 104 receives node-output information 150 from processorless central equipment 106 in the pre-assigned instance of time slot 148 of the set of time slots that comprises communication frame 402 of central-output information 152. In a further example, central equipment 106 in one example gates node-output information 150 with clock 162 to obtain node-output information 152 in the pre-assigned instance of time slot 148 of the set of time slots that comprises communication frame 402 of central-output information 152.

In a further example, referring to FIG. 1, communication node 104 sends a second instance of node-output information 150 to central equipment 106 within interval 406 before a second instance of time slot 148 of communication frame 402 of central-output information 152. Communication node 104 in one example receives the second instance of node-output information 152 from central equipment 106 in the second instance of time slot 148 of central-output information 152.

Again referring to FIG. 1, each instance of communication node 104 in one example sends its respective instance of node-output information 150 to central equipment 106. Central equipment 106 in one example synchronizes, gates, and combines the instances of node-output information 150 to form system backbone information that comprises central-output information 152. Central-output information 152 in one example comprises all the instances of node-output information 150. In one example, central equipment 106 distributes all the instances of node-output information 150 to each instance of communication node 104. So, all instances of communication node 104 in one example have unrestricted access to all the instances of node-output information 150, for example, the system backbone information.

Still referring to FIG. 1, communication node 104 in one example sends node-output information 150 to central equipment 106, and receives from central equipment 106 node-output information 150 in time slot 148 of communication frame 402 of central-output information 152. In a further example, communication node 104 compares one or more values of node-output information 104 with one or more values from the particular instance of time slot 148 of communication frame 402 of central-output information 152 to check correctness of operation of one or more portions of system 100.

Figure 2:
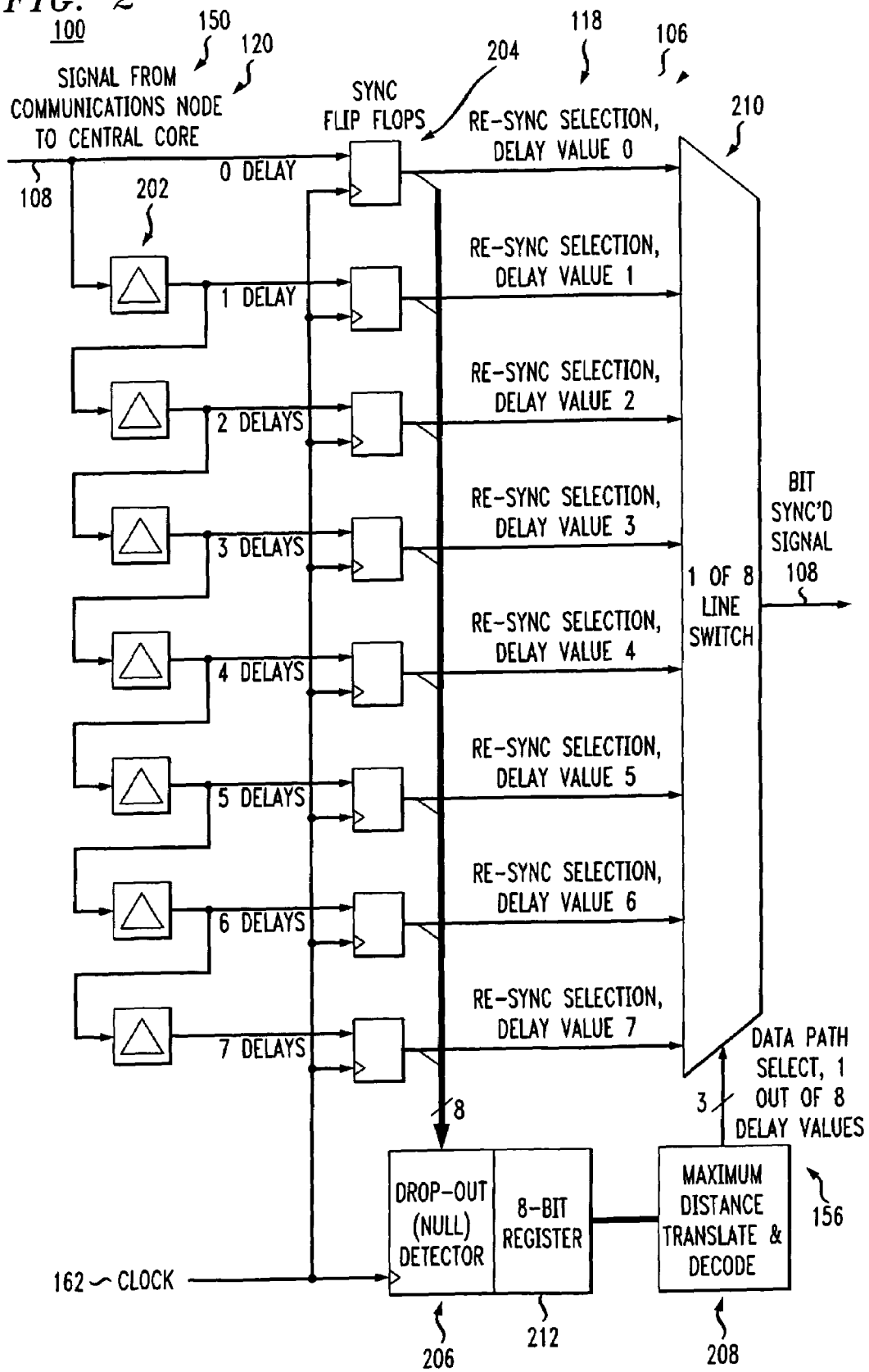
FIG. 2 represents illustrative details of one example of a synchronization component of an instance of a communication node of the system of FIG. 1.

Turning to FIG. 2, synchronization component 156 in one example comprises one or more instances of delay component 202, one or more instances of flip-flop component 204, one or more instances of passage 108, one or more instances of detector component 206, one or more instances of translate and decode component 208, and one or more instances of multiplexer component 210. Multiplexer component 210 in one example comprises a 1-of-8 line switch. One or more instances of synchronization component 156 in one example comprise a field programmable gate array ("FPGA"), as will be appreciated by those skilled in the art.

Referring to FIGS. 1–2, respective instances of node-output information 150 on passages 124, 128, 132, and 136 from output interface 140 of communication nodes 110, 112, 114, and 116, respectively, in one example are frequency-locked to clock 162. In a further example, phase relationships of the respective instances of node-output information 150 from communication nodes 110, 112, 114, and 116 relative to clock 162 are unknown. So, synchronization component 156 in one example asserts delay that serves to cause an instance of node-output information 150 to be at a stable point in its cycle simultaneously with edges of clock 162. For example, synchronization component 156 serves to synchronize a stable part of node-output information 150 with an edge in a cycle of clock 162. Each instance of node-output information 150 from communication nodes 110, 112, 114, and 116 in one example is coupled with a respective instance of synchronization component 156, as will be appreciated by those skilled in the art.

Referring again to FIGS. 1–2, synchronization component 156 in one example distributes respective instances of node-output information 150 from communication nodes 110, 112, 114, and 116 into eight phases, for example, nominally over a single bit period. In one example, detector component 206 searches the outputs of the instances of flip-flop component 204 for an anomaly which, although infrequent, indicates that a phase of the corresponding instance of node-output information 150, from an instance of communication node 104, and clock 162 have had nearly simultaneous transitions. Detector component 206 in one example selects the most stable phase of the corresponding instance of node-output information 150, which corresponds to an output of the instance of flip-flop component 204 that is the greatest relative distance from the instance of flip-flop component 204 showing the anomaly.

Figure 7:
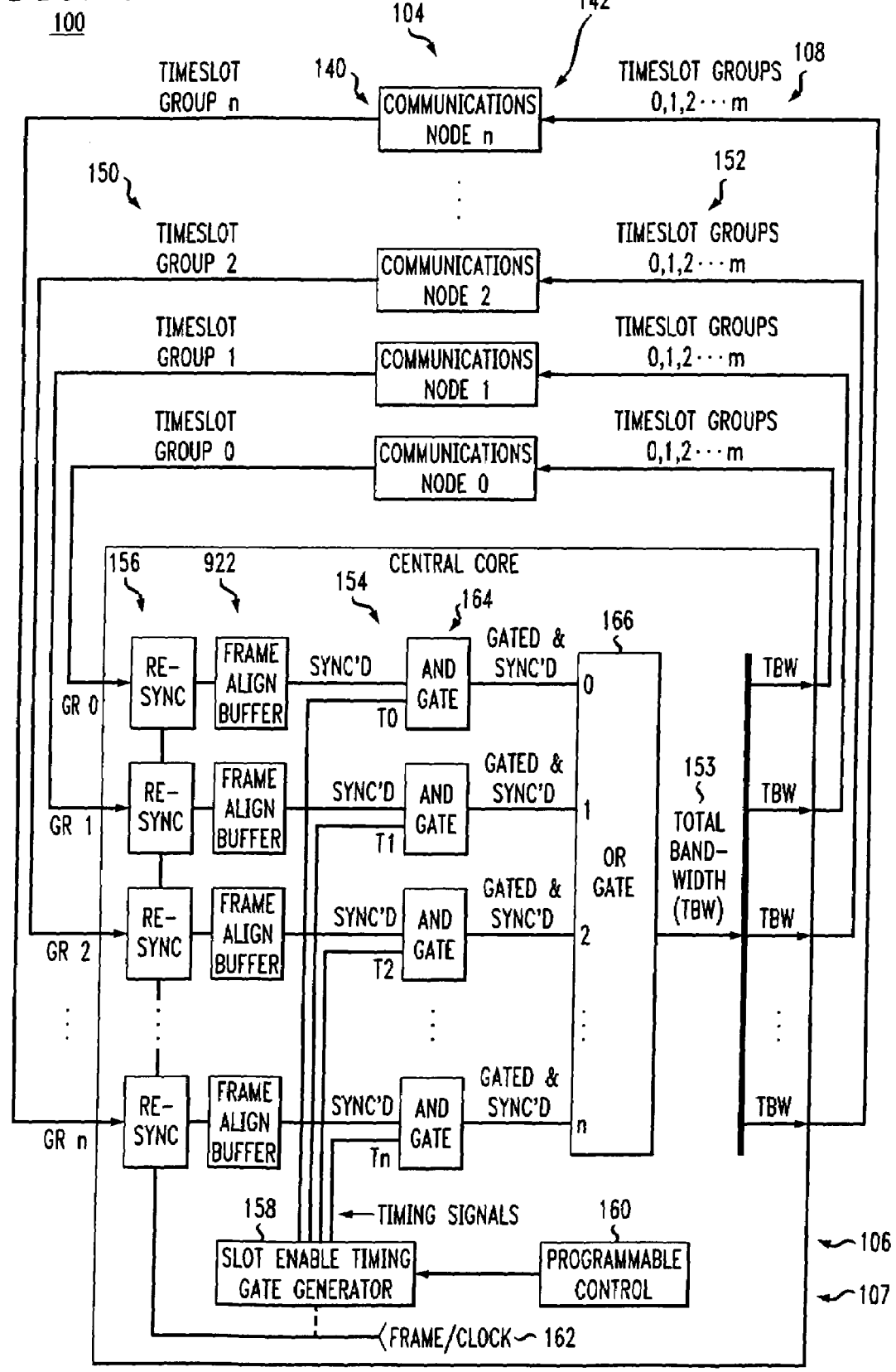
FIG. 7 is similar to FIG. 1 and further illustrates exemplary details of one example of one or more instances of a buffer component in one or more instances of central equipment of the system of FIG. 1.

In a further example, referring to FIGS. 2 and 7, detector component 206 switches the output of the instance of flip-flop component 204 that is the greatest relative distance from the instance of flip-flop component 204 showing the anomaly, through multiplexer component 210 to a corresponding instance of buffer component 922. Since detected anomalies in one example are infrequent, memory 212 of detector component 206 stores a value from any last change of an output of an instance of flip-flop component 204 that is a greatest relative distance from an instance of flip-flop component 204 showing an anomaly.

Still referring to FIGS. 1–2, detector component 206 in one example during initialization of system 100 selects an output of an instance of flip-flop component 204 that is a greatest relative distance from an instance of flip-flop component 204 showing an anomaly, and does not change this selection since in one example lengths of instances of passage 108 between an instance of central equipment 106 and respective instances of communication node 104 are fixed during installation. In one example, system 100 employs signal scrambling techniques for instances of node-output information 150 during initialization of system 100, for example, to ensure frequent bit activity and aid in bit synchronization, as will be appreciated by those skilled in the art.

For example, referring to FIGS. 1–2, central equipment 106 determines a zero or more amount of delay to assert for relative synchronization between a stable part of node-output information 150 and a clock edge that is employed to produce central-output information 152.

In one example, referring to FIGS. 1–2, synchronization of the stable parts of respective instances of node-output information 150 from respective instances of communication node 104, with the edges of clock 162 allows an instance of central equipment 106 to employ advantageously simple and high-speed logic for combination of the instances of node-output information 150 into an instance of central-output information 152.

Referring again to FIGS. 1–2, an illustrative description of exemplary operation of one or more portions of system 100 is now presented, for explanatory purposes. For Optical Carrier 1 ("OC-1," 51.8-MHz) speeds, each instance of communication frame 402 at start 404 (FIG. 4) in one example comprises two framing bytes with a given pattern. In another example, each instance of communication frame 402 at start 404 comprises six framing bytes, interlaced in a nine byte pattern at the beginning for Optical Carrier 3 ("OC-3," 155.4-MHz).

Referring still to FIGS. 1–2, advantageous simplicity of this synchronization and multiplexing process in one example promotes low delays in system 100. In one example, an instance of communication frame 402 in one or more instances of node-output information 150 sent from any instance of communication node 104 is received by all instances of communication node 104 in a same instance of communication frame 402 of one or more instances of central-output information 152 from an instance of central equipment 106.

If system 100 in one example, referring to FIG. 1, were to synchronize sending of one or more instances of communication frame 402 in one or more instances of node-output information 150 from one or more instances of communication node 104 to one or more instances of central equipment 106, with receipt by the one or more instances of communication node 104 of one or more instances of communication frame 402 in one or more instances of central-output information 152 from the one or more instances of central equipment 106, then, due to signal-propagation delay through one or more instances of passage 108, one or more instances of communication frame 402 in one or more instances of node-output information 150 in one example would arrive at central equipment 106 undesirably after a start of formation by the one or more instances of central equipment 106 of a next instance of communication frame 402 for one or more instances of central-output information 152. This in one example would disadvantageously require buffering of an instance of communication frame 402 from each instance of communication node 104 until a start of formation by the one or more instances of central equipment 106 of a subsequent instance of communication frame 402 for central-output information 152.

So, turning to FIGS. 3–4, communication node 104 in one example sends node-output information 150 to central equipment 106 no later than interval 406 before start 404 of communication frame 402 in which that communication node 104 receives central-output information 152 from central equipment 106. A time duration of interval 406 in one example is minor relative to a time duration of communication frame 402.

Figure 3:
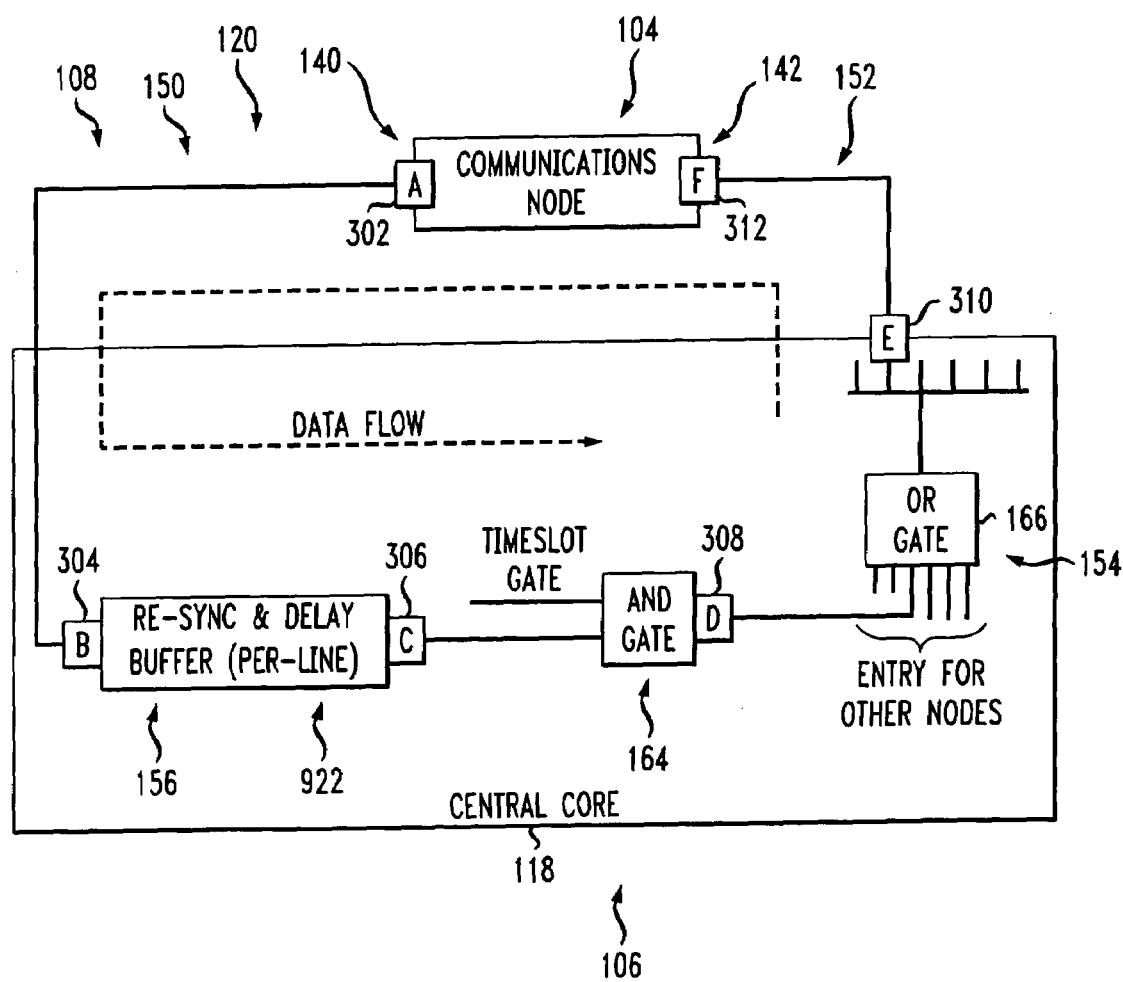
FIGS. 3–4 represents illustrative details of one example of synchronization and self-configuration through employment of one or more portions of the system of FIG. 1.

In another example, referring to FIGS. 3–4, communication node 104 sends node-output information 150 to central equipment 106 within interval 406 before a particular instance of time slot 148 of communication frame 402 of central-output information 152. In a further example, communication node 104 receives node-output information 150 from central equipment 106 in the particular instance of time slot 148 of communication frame 402 of central-output information 152.

In a further example, referring to FIGS. 3–4, a plurality of instances of communication node 104 send node-output information 150 to central equipment 106 no later than an interval 406 before start 404 of communication frame 402 in which the plurality of instances of communication node 104 receive central-output information 152 from central equipment 106. In one example, each instance of communication node 104 receives central-output information 152 in a respective instance of communication frame 402, for example, over a respective instance of passage 108. The instances of communication frame 402 in one example comprise an approximately same time duration.

This in one example, referring to FIGS. 3–4, presents a need for only advantageously small one or more instances of buffer component 922 to compensate for differences in signal-propagation delay from different instances of communication node 104 to central equipment 106. In a further example, this serves to advantageously avoid delay by desirably allowing inclusion of one or more instances of node-output information 150 from one or more instances of communication node 104 in a same instance of communication frame 402 of one or more instances of central-output information 152.

In a further example, referring to FIGS. 3–4, central equipment 106 receives node-output information 150 no earlier than interval 406 before start 404 of communication frame 402 in which central equipment 106 sends central-output information 152 to a plurality of instances of communication node 104. In a still further example, central equipment 106 receives node-output information 150 within interval 406 before time slot 148 of communication frame 402 of central-output information 152. For example, central equipment 106 sends node-output information 150 to communication node 104 in time slot 148 of communication frame 402 of central-output information 152. In one example, central equipment 106 within communication frame 402 employs a plurality of instances of node-output information 150 from a plurality of instances of communication node 104 to produce central-output information 152, and within the same instance of communication frame 402 send central-output information 152 to the plurality of instances of communication node 104.

Again referring to FIGS. 3–4, interval 406 in one example is a function of transmission speed of instances of passage 108 (e.g., passages 124, 128, 132, and 136) that carry instances of node-output information 150, length of the instances of passage 108, and size of instances of buffer component 922. In one example, interval 406 is (e.g., approximately) equal to a maximal signal-propagation delay over passages 124, 128, 132, and 136, for example, that comprise respective instances of fiberoptic passage 122 or respective copper passages. For example, a time duration of interval 406 is approximately equal to a maximal expected signal-propagation delay between central equipment 106 and a plurality of instances of communication node 104 over a respective plurality of operable instances of passage 108. Interval 406 in one example is 1.23 microseconds (μsec). In one example, a time duration of interval 406 is minor relative to a time duration (e.g., 125 microseconds) of communication frame 402. In a further example, interval 406 is less than five percent of a time duration of communication frame 402. In another example, interval 406 is less than one percent of a time duration of communication frame 402.

Still referring to FIGS. 3–4, communication node 104 in one example receives central-output information 152 from central equipment 106 in time slot 148 of communication frame 402 within another instance of interval 406, for example, with a time duration that is minor relative to a time duration of communication frame 402.

Further referring to FIGS. 3–4, an illustrative description of exemplary parameters for one or more portions of system 100 is now presented, for explanatory purposes. One example of (e.g., practical) parameters for a small system using Optical Carrier 1 ("OC-1," 51.8-MHz) for communication between communication node 104 and central equipment 106 and N=810 instances of time slot 148 in communication frame 402 are: size of buffer component 922=64 bits; maximum allowed distance between communication node 104 and central equipment 106 over passage 108=122 meters (400 feet); size of buffer component 922 to number of bits per instance of communication frame 402 at 51.8 MHz.=0.988%, for example, less than one percent of communication frame 402.

In one example, referring to FIGS. 3–4, a size of buffer component 922 (e.g., 64 bits) in central equipment 106 and a time duration ahead that communication node 104 sends its data before receiving its allocated bytes in communication frame 402 (e.g., also 64 bits), serves in one example to determine what distance communication node 104 can be from central equipment 106. Using 64 bits in one example, the speed of light in fiber optics, and an exemplary propagation time through central equipment 106, communications node 104 in one example can be from 0.3 to 121.9 meters (1 to 400 feet) from central equipment 106. In another example, larger instance of buffer component 922 in central equipment 106 and pre-send time for communication node 104 would allow for greater distances.

Referring still to FIGS. 3–4, STEPS 302, 304, 306, 308, 310, and 312 in one example serve to illustrate exemplary synchronization and self-configuration through employment of one or more portions of system 100, for explanatory purposes. In one example, STEPS 302, 304, and 306 serve to illustrate one or more portions of exemplary synchronization of communication frame 402 in node-output information 150 and communication frame 402 for central-output information 152. At STEP 302 in one example communication node 104 sends communication frame 402 in node-output information 150 interval 406 before start 404 of formation by central equipment 106 of a next instance of communication frame 402 for central-output information 152. At STEP 304 in one example central equipment 106 receives communication frame 402 in node-output information 150 interval 406 before start 404 of formation by central equipment 106 of a next instance of communication frame 402 for central-output information 152. At STEP 306 in one example buffer component 922 serves to align communication frame 402 of node-output information 150 with communication frame 402 of central-output information 152.

In another example, referring to FIGS. 3–4, STEPS 302, 304, 306, 308, 310, and 312 serve to illustrate one or more portions of exemplary identification of instances of time slot 148 that are assigned to an instance of communication node 104. For example, STEPS 302, 304, 306, 308, 310, and 312 serve to illustrate exemplary self-configuration of an instance of communication node 104 through employment of central equipment 106. At STEP 302 in one example communication node 104 initializes and transmits a unique bit pattern in every instance of time slot 148 of communication frame 402 in node-output information 150. STEP 304 and 306 in one example proceed as discussed above. At STEP 308 in one example central equipment 106 employs an instance of AND gate 164 to allows data to pass only in one or more instances of time slot 148 assigned to that instance of communication node 104. In a further example, this AND gating serves as a safety protection against any instance of communication node 104 (e.g., inadvertently) transmitting data in an instance of time slot 148 not assigned to the particular instance of communication node 104.

Again referring to FIGS. 3–4, at STEP 310 in one example central equipment 106 employs OR gate 166 to combine the filtered data from all the instances of communication node 104 to form the system communications backbone, for example, node-output information 150. At STEP 312 the initializing instance of communication node 104 receives the next instance of communication frame 402 of node-output information 150 from central equipment 106 and looks to see which one or more instances of time slot 148 in that instance of communication frame 402 of node-output information 150 contains the unique bit pattern transmitted by the initializing instance of communication node 104. The one or more instances of time slot 148 of node-output information 150 containing the unique bit pattern are one or more instances of time slot 148 that assigned to the particular instance of communication node 104.

Further referring to FIGS. 3–4, communication node 104 in one example sends node-output information 150 to central equipment 106 in at least a majority of instances of time slot 148 of a first set of time slots that corresponds to at least a majority of instances of time slot 148 of a second set of time slots of central-output information 152. In one example, communication node 104 identifies one or more time slots of the second set of time slots that are assigned to that instance of communication node 104 through identification of the particular instance of node-output information 150 in each of the time slots of the second set of time slots of the instance of central-output information 152. For example, communication node 104 sends the particular instance of node-output information 150 to central equipment 106 in one or more time slots of the first set of time slots contemporaneously with receipt by that instance of communication node 104 of one or more time slots of the second set of time slots of the portion of the instance of central-output information 152.

Again referring to FIGS. 3–4, communication node 104 in one example sends node-output information 150 to central equipment 106 in an instance of time slot 148, not assigned to the particular instance of communication node 104, of a first set of time slots that corresponds to a time slot, not assigned to the particular instance of communication node 104, of a second set of time slots of central-output information 152. Central equipment 106 in one example withholds the instance of node-output information 150 from the time slot, not assigned to the communication node, of the second set of time slots of the central-output information through clock gating of the instance of node-output information 150 in the time slot, not assigned to the first communication node, of the first set of time slots.

Figure 6:
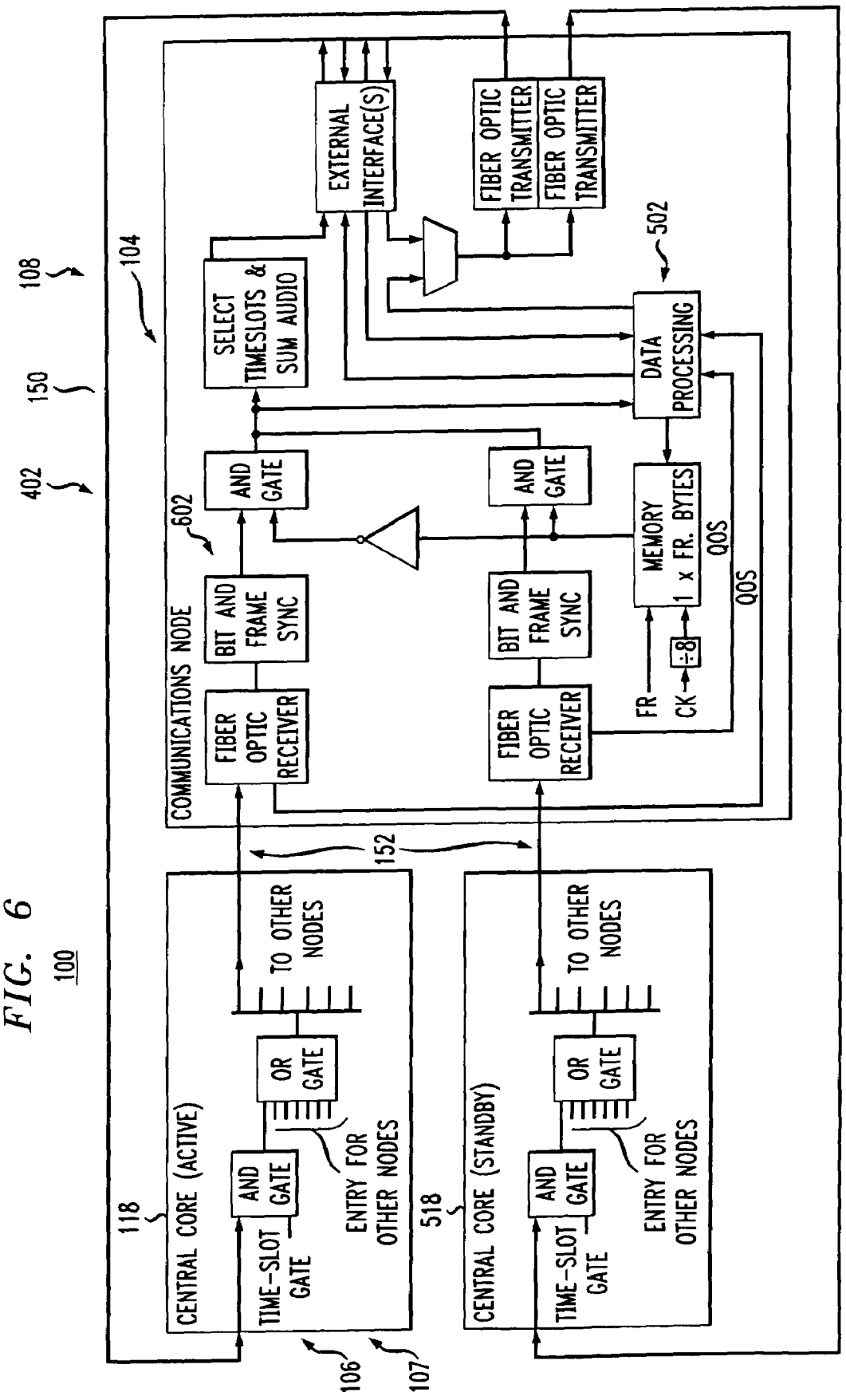

Turning to FIGS. 5–6, an illustrative description of exemplary redundancy of a plurality of portions of system 100 is now presented, for explanatory purposes. Unless one or more communication failures in system 100 interfere, one or more (e.g., all) instances of communication node 104 receive same data in instances of central-output information 152 from respective instances of central equipment 106. In a further example, absent interfering communication failure in system 100, one or more (e.g., all) instances of communication node 104 send same data in instances of node-output information 150 to respective instances of central equipment 106.

Again referring to FIGS. 5–6, central equipment 118 and 518 in one example send to communication node 104, same data in respective instances of central-output information 152. In a further example, central equipment 118 and 518 receive same data in respective instances of node-output information 150 from communication node 104.

Referring still to FIGS. 5–6, same data in instances of central-output information 152 from respective instances of central equipment 106 in one example are not aligned, bit by bit, but in one example are nearly aligned in their respective instances of communication frame 402. In one example, communications node 104 employs two identical instances of bit and frame synchronizer component 602, for example, to extract and line up the instances of central-output information 152 for processing by processor 502.

Further referring to FIGS. 5–6, processor 502 in one example performs one or more tests on the instances of central-output information 152, for example, to determine occurrence of one or more failures or problems. In one example, should an instance of communication node 104 determine that the instances of central equipment 106 and connecting instances of passage 108 are fully operational, communication node 104 employs a default selection for an active link, for example, one or more instances of passage 108 between the instance of communication node 104 and central equipment 118. In a further example, if an instance of communication node 104 detects a problem in central equipment 118 and/or one or more connecting instances of passage 108, the instance of communication node 104 in one example automatically switches the active link to central equipment 518.

Again referring to FIGS. 5–6, notwithstanding which instance of central equipment 106 an instance of communication node 104 selects for an active link, each instance of communication node 104 in one example continuously sends same data in respective instances of node-output information 150 to each instance of central equipment 106. This in one example advantageously allows each instance of communication node 104 actively using any (e.g., either) instance of central equipment 106 to have access to data from all instances of communication node 104 in system 100.

In one example, referring to FIGS. 5–6, communication node 104 processes information generated during operation of the communication node to select a subportion central-output information 152 from central equipment 118 for employment by the communication node, and a subportion of central-output information 152 from central equipment 518 for employment by the communication node. For example, communication node 104 compares one or more values of node-output information 150 with one or more values of a portion of information from central equipment 118 in time slot 148 of a first set of time slots that comprises a first communication frame in which the communication node receives from the first processorless-central equipment central-output information 152. In a further example, communication node 104 compares one or more values of node-output information 150 with one or more values of a portion of information from central equipment 518 in the time slot of a second set of time slots that comprises a second communication frame in which the communication node receives from central equipment 518 central-output information 152. In a still further example, communication node 104 employs the comparisons to select either a portion of central-output information 152 from central equipment 118 or a portion of central-output information 152 from central equipment 518, for employment by the communication node in conjunction with the time slot of the first set of time slots and in conjunction with the time slot of the second set of time slots.

Returning to FIG. 1, in one example, one or more instances of communication node 104 comprise one or more instances of a maintenance node that receives and monitors central-output information 152 from central equipment 106, for example, to check correctness of operation of one or more portions of system 100. In a further example, an instance of communication node 104 that comprises a maintenance node sends one or more report portions in node-output information 150 to central equipment 106, as will be appreciated by those skilled in the art.

A frame synchronizer for a given line in one example uses the data stream that has been bit synchronized, sends the bit stream through a 64 bit shift register, and continually searches for a framing bit pattern. When a pattern has been found, the delay count gate flip-flop in one example is set, which allows the distance counter in one example to count up until the delay count gate flip-flop is reset by the internal frame signal. The value in the distance counter in one example is used to translate to a value stored and to select one of 64 outputs of the shift register connected to one of 64 inputs to a multiplexer. This in one example provides an adjustable delay, and aligns the external frame to the internal frame marker.

The flow diagrams depicted herein are just exemplary. There may be many variations to these diagrams or the steps or operations described therein without departing from the spirit of the invention. For instance, the steps may be performed in a differing order, or steps may be added, deleted, or modified.

Although exemplary embodiments of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A system, comprising:
    a first communication node of a plurality of communication nodes connected with processorless central equipment, wherein the first communication node sends one or more first portions of node-output information to the processorless central equipment, and wherein the first communication node has one or more instances of a data interface and a video interface, and wherein the first communication node and the processorless central equipment communicate through employment of a time division multiplexing format; and
    wherein one or more additional communication nodes of the plurality of communication nodes send one or more additional portions of node-output information to the processorless central equipment; and
    wherein the first communication node receives from the processorless central equipment a portion of central-output information, and wherein the portion of central-output information comprises the one or more first portions of node-output information and the one or more additional portions of node-output information.

2. The system of claim 1, wherein the first communication node sends the one or more first portions of node-output information to the processorless central equipment in a communication frame; and
    wherein the first communication node receives from the processorless central equipment the portion of central-output information in the communication frame.

3. The system of claim 1, wherein the first communication node sends the one or more first portions of node-output information to the processorless central equipment no later than an interval before a start of a communication frame in which the first communication node receives from the processorless central equipment the portion of central output information, and wherein a time duration of the interval is substantially small relative to a time duration of the communication frame.

4. The system of claim 3 in combination with a second communication node of the one or more additional communication nodes, wherein the second communication node sends one or more of the one or more additional portions of node output information to the processorless central equipment no later than the interval before a start of a communication frame in which the second communication node receives from the processorless central equipment the portion of central output information, and wherein the communication frame in which the first communication node receives from the processorless central equipment the portion of central output information and the communication frame in which the second communication node receives from the processorless central equipment the portion of central output information comprise the same time duration.

5. The system of claim 1, wherein the first communication node sends one of the one or more first portions of node-output information to the processorless central equipment within an interval before a time slot of a communication frame of the portion of central-output information, and wherein a time duration of the interval is substantially small relative to a time duration of the communication frame; and
    wherein the first communication node receives from the processorless central equipment the one of the one or more first portions of node-output information in the time slot of the communication frame of the portion of central-output information.

6. The system of claim 5, wherein the time slot comprises a pre-assigned time slot of a set of time slots that comprises the communication frame of the portion of central output information; and
    wherein the first communication node sends one of the one or more first portions of node-output information to the processorless central equipment within the interval before the pre-assigned time slot of the set of time slots that comprises the communication frame of the portion of central-output information; and
    wherein the first communication node receives from the processorless central equipment the one of the one or more first portions of node-output information in the pre assigned time slot of the set of time slots that comprises the communication frame of the portion of central-output information.

7. The system of claim 6 in combination with the processorless central equipment, wherein the processorless central equipment gates the one of the one or more first portions of node-output information with a clock to obtain the one of the one or more first portions of node-output information in the pre assigned time slot of the set of time slots that comprises the communication frame of the portion of central-output information.

8. The system of claim 5, wherein the time duration of the interval is substantially equal to a maximal expected signal-propagation delay between the processorless central equipment and the plurality of communication nodes over a respective plurality of operable passages.

9. The system of claim 5, wherein the time duration of the interval is less than five percent of the time duration of the communication frame.

10. The system of claim 5, wherein the interval comprises a first interval, wherein the first communication node receives from the processorless central equipment the portion of central-output information in the time slot of the communication frame within a second interval, and wherein a time duration of the second interval is substantially small relative to a time duration of the communication frame.

11. The system of claim 5, wherein the one of the one or more first portions of node-output information comprises a first one of the one or more first portions of node-output information, and wherein the time slot of the communication frame of the portion of central output information comprises a first time slot of the communication frame of the portion of central-output information; and wherein the first communication node sends a second one of the one or more first portions of node-output information to the processorless central equipment within the interval before a second time slot of the communication frame of the portion of central-output information; and wherein the first communication node receives from the processorless central equipment the second one of the one or more first portions of node-output information in the second time slot of the portion of central-output information.

12. The system of claim 1, wherein the first communication node sends one of the one or more first portions of node-output information to the processorless central equipment; and wherein the first communication node receives from the processorless central equipment the one of the one or more first portions of node-output information in a time slot of a communication frame of the portion of central-output information; and wherein the first communication node compares one or more values of the one of the one or more first portions of node-output information with one or more values from the time slot of the communication frame of the portion of central-output information to check correctness of operation of one or more portions of the system.

13. The system of claim 1, wherein the first communication node processes any one or more of:

the one or more first portions of node-output information; and the one or more additional portions of node-output information from the portion of central-output information.

14. The system of claim 1 in combination with a second communication node of the one or more additional communication nodes, wherein the second communication node sends one or more of the one or more additional portions of node-output information to the processorless central equipment, and wherein the second communication node receives from the processorless central equipment the portion of central-output information.

15. The system of claim 1, further comprising a fiberoptic passage of one or more fiberoptic passages that serve to connect the first communication node with the processorless central equipment, wherein the first communication node sends the one or more first portions of node-output information to the processorless central equipment over the fiberoptic passage.

16. The system of claim 1, further comprising a fiberoptic passage of one or more fiberoptic passages that serve to connect the first communication node with the processorless central equipment, wherein the first communication node receives from the processorless central equipment the portion of central-output information over the fiberoptic passage.

17. The system of claim 1, further comprising a copper passage of one or more copper passages that serve to connect the first communication node with the processorless central equipment, wherein the first communication node sends the one or more first portions of node-output information to the processorless central equipment over the copper passage.

18. The system of claim 1, further comprising a copper passage of one or more copper passages that serve to connect the first communication node with the processorless central equipment, wherein the first communication node receives from the processorless central equipment the portion of central-output information over the copper passage.

19. The system of claim 1 in combination with the processorless central equipment, wherein the processorless central equipment receives the one or more first portions of node-output information and the one or more additional portions of node-output information no earlier than an interval before a start of a communication frame in which the processorless central equipment sends the portion of central-output information to the plurality of communication nodes, and wherein a time duration of the interval is substantially small relative to a time duration of the communication frame.

20. The system of claim 1 in combination with the processorless central equipment, wherein the processorless central equipment receives one of the one or more first portions of node-output information within an interval before a time slot of a communication frame of the portion of central-output information, and wherein a time duration of the interval is substantially small relative to a time duration of the communication frame; and wherein the processorless central equipment sends the one of the one or more first portions of node-output information to the first communication node in the time slot of the communication frame of the portion of central-output information.

21. The system of claim 1 in combination with the processorless central equipment, wherein the processorless central equipment within a communication frame employs the one or more first portions of node-output information and the one or more additional portions of node-output information to produce the portion of central output information and sends the portion of central-output information to the plurality of communication nodes.

22. The system of claim 1 in combination with the processorless central equipment and the one or more additional communication nodes, wherein the first communication node, the processorless central equipment, and the one or more additional communication nodes comprise a time division multiplexing architecture.

23. The system of claim 1 in combination with the processorless central equipment and a second communication node of the one or more additional communication nodes;
  wherein the first communication node sends one of the one or more first portions of node-output information to the processorless central equipment within an interval before a first pre-assigned time slot of a first set of time slots that comprises a first communication frame in which the first communication node receives from the processorless central equipment the portion of central output information and within the interval before the first pre assigned time slot of a second set of time slots that comprises a second communication frame in which the second communication node receives from the processorless central equipment the portion of central output information, and wherein the first and second communication frames comprise an approximately same time duration, wherein a time duration of the interval is substantially small relative to the approximately same time duration of the first and second communication frames; and
  wherein the second communication node sends one of the one or more additional portions of node-output information to the processorless central equipment within the interval before a second pre-assigned time slot of the first set of time slots that comprises the first communication frame in which the first communication node receives from the processorless central equipment the portion of central output information and within the interval before the second pre assigned time slot of the second set of time slots that comprises the second communication frame in which the second communication node receives from the processorless central equipment the portion of central output information; and
  wherein the processorless central equipment gates the one of the one or more first portions of node-output information with a clock to obtain the one of the one or more first portions of node output information in the first pre-assigned time slot of the first set of time slots and in the first pre-assigned time slot of the second set of time slots; and
  wherein the processorless central equipment gates the one of the one or more additional portions of node-output information with the clock to obtain the one of the one or more additional portions of node-output information in the second pre-assigned time slot of the first set of time slots and in the second pre-assigned time slot of the second set of time slots; and
  wherein the first communication node receives the one of the one or more first portions of node-output information in the first pre-assigned time slot of the first set of time slots and the one of the one or more additional portions of node-output information in the second pre-assigned time slot of the first set of time slots; and
  wherein the second communication node receives the one of the one or more first portions of node-output information in the first pre-assigned time slot of the second set of time slots and the one of the one or more additional portions of node-output information in the second pre-assigned time slot of the second set of time slots.

24. The system of claim 1, wherein the first communication node sends one of the one or more first portions of node-output information to the processorless central equipment in at least a majority of time slots of a first set of time slots that corresponds to at least a majority of time slots of a second set of time slots of the portion of central output information; and
  wherein the first communication node identifies one or more time slots of the second set of time slots that are assigned to the first communication node through identification of the one of the one or more first portions of node-output information in each of the one or more time slots, that are assigned to the first communication node, of the second set of time slots of the portion of central output information.

25. The system of claim 24, wherein the first communication node sends the one of the one or more first portions of node-output information to the processorless central equipment in one or more time slots of the first set of time slots simultaneously with receipt by the first communication node of one or more time slots of the second set of time slots of the portion of central output information.

26. The system of claim 1 in combination with the processorless central equipment, wherein the first communication node sends one of the one or more first portions of node-output information to the processorless central equipment in a time slot, not assigned to the first communication node, the time slot being of a first set of time slots that corresponds to a time slot, not assigned to the first communication node, of a second set of time slots of the portion of central output information; and
  wherein the processorless central equipment withholds the one of the one or more first portions of node-output information from the time slot, not assigned to the first communication node, of the second set of time slots of the portion of central output information through clock gating of the one or more first portions of node-output information in the time slot, not assigned to the first communication node, of the first set of time slots.

27. The system of claim 1 in combination with the processorless central equipment, wherein the processorless central equipment employs one of the one or more first portions of node-output information, a clock, and a plurality of flip-flops to determine a zero or more amount of delay to assert for relative synchronization between a stable part of the one of the one or more first portions of node-output information and a clock edge that is employed to produce the portion of central-output information.

28. The system of claim 1 in combination with the processorless central equipment, wherein the processorless central equipment comprises first processorless-central equipment, further comprising a second processorless-central equipment that is connected with the plurality of communication nodes; and
  wherein the portion of central-output information comprises a portion of first central-output information; and
  wherein the first communication node sends the one or more first portions of node-output information to the first processorless-central equipment and to the second processorless-central equipment, and wherein the one or more additional communication nodes send the one or more additional portions of node-output information to the first processorless-central equipment and to the second processorless-central equipment; and wherein the first communication node receives the portion of first central-output information from the first processorless-central equipment.

29. The system of claim 28, wherein the first communication node receives the portion of first central-output information from the first processorless-central equipment and a portion of second central-output information from the second processorless-central equipment, and wherein the portion of second central-output information comprises one or more of:
   the one or more first portions of node-output information; and
   the one or more additional portions of node-output information.

30. The system of claim 29, wherein the first communication node processes information generated during operation of the first communication node to select a first subportion of the portion of first central-output information for employment by the first communication node and a second subportion of the portion of the second central-output information for employment by the first communication node.

31. The system of claim 28, wherein the first communication node sends one of the one or more first portions of node-output information to the first processorless-central equipment in a time slot that corresponds to a time slot of a first set of time slots that comprises a first communication frame in which the first communication node receives from the first processorless-central equipment the portion of first central-output information; and
   wherein the first communication node sends the one of the one or more first portions of node-output information to the second processorless-central equipment in a time slot that corresponds to a time slot of a second set of time slots that comprises a second communication frame in which the first communication node receives from the second processorless-central equipment a portion of second central-output information; and
   wherein the first communication node receives a portion of information from the first processorless-central equipment in the time slot of the first set of time slots; and
   wherein the first communication node receives a portion of information from the second processorless-central equipment in the time slot of the second set of time slots; and
   wherein the first communication node compares one or more values of the one of the one or more first portions of node-output information with one or more values of the portion of information from the first processorless-central equipment in the time slot of the first set of time slots and with one or more values of the portion of information from the second processorless-central equipment in the time slot of the second set of time slots to select either the portion of first central-output information or the portion of second central-output information for employment by the first communication node in conjunction with the time slot of the first set of time slots and in conjunction with the time slot of the second set of time slots.

32. The system of claim 1 in combination with a maintenance node of one or more maintenance nodes of the one or more additional communication nodes, wherein the maintenance node receives from the processorless central equipment the portion of central-output information, and wherein the maintenance node monitors the one or more first portions of node-output information and the one or more additional portions of node-output information from the portion of central-output information to check correctness of operation of one or more portions of the system, and wherein the maintenance node sends one or more report portions, of the one or more additional portions of node-output information, to the processorless central equipment.

33. The system of claim 1 in combination with the plurality of communication nodes, wherein each of the plurality of communication nodes sends a corresponding one or more portions of node-output information to the processorless central equipment, and wherein each of the plurality of communication nodes receives from the processorless central equipment the portion of central-output information, and wherein the portion of central-output information comprises all the portions of node-output information.

34. A method, comprising the steps of:
   sending one or more first portions of node-output information to processorless central equipment from a first communication node of a plurality of communication nodes connected with the processorless central equipment, wherein one or more additional communication nodes of the plurality of communication nodes send one or more additional portions of node-output information to the processorless central equipment, and wherein the first communication node has one or more instances of a data interface and a video interface, and wherein the first communication node and the processorless central equipment communicate through employment of a time division multiplexing format; and
   receiving at the first communication node a portion of central-output information from the processorless central equipment, wherein the portion of central-output information comprises the one or more first portions of node-output information and the one or more additional portions of node-output information.

35. The method of claim 34, wherein the step of sending the one or more first portions of node-output information to the processorless central equipment from the first communication node of the plurality of communication nodes connected with the processorless central equipment and the step of receiving at the first communication node the portion of central-output information from the processorless central equipment comprise the steps of:
   selecting a time duration of an interval to be approximately equal to a maximal expected signal-propagation delay between the processorless central equipment and the plurality of communication nodes over a respective plurality of operable passages;
   sending one of the one or more first portions of node-output information to the processorless central equipment from the first communication node within the interval before a time slot of a communication frame of the portion of central-output information, wherein a time duration of the interval is substantially small relative to a time duration of the communication frame; and
   receiving at the first communication node the one of the one or more first portions of node-output information in the time slot of the communication frame of the portion of central-output information from the processorless central equipment.

36. The method of claim 34, wherein the step of sending the one or more first portions of node-output information to the processorless central equipment from the first communication node of the plurality of communication nodes connected with the processorless central equipment and the step of receiving at the first communication node the portion of central-output information from the processorless central equipment comprise the steps of:

sending a corresponding one or more portions of node-output information to the processorless central equipment from each of the plurality of communication nodes; and receiving at each of the plurality of communication nodes the portion of central-output information from the processorless central equipment, wherein the portion of central-output information comprises all the portions of node-output information.

* * * * *